United States Patent

Zimmer

[11] Patent Number: 5,231,688
[45] Date of Patent: Jul. 27, 1993

[54] FURCATION KIT

[75] Inventor: Rainer M. Zimmer, Hickory, N.C.

[73] Assignee: Siecor Corporation, Hickory, N.C.

[21] Appl. No.: 772,320

[22] Filed: Oct. 7, 1991

[51] Int. Cl.$^5$ .............................................. G02B 6/36
[52] U.S. Cl. ...................................... 385/139; 385/136
[58] Field of Search ...................... 385/78, 81, 84, 86, 385/87, 139, 136

[56] References Cited

U.S. PATENT DOCUMENTS

| | | | |
|---|---|---|---|
| 4,441,786 | 4/1984 | Hulin et al. ........................ | 385/139 |
| 4,657,340 | 4/1987 | Tanaka et al. ...................... | 385/139 |
| 4,765,700 | 8/1988 | Ito ....................................... | 385/139 |
| 4,826,277 | 5/1989 | Weber et al. ...................... | 350/96.23 |
| 4,976,508 | 12/1990 | Okura et al. ...................... | 350/96.23 |
| 5,016,968 | 5/1991 | Hammond et al. ................. | 385/78 |
| 5,071,219 | 12/1991 | Yurtin et al. ........................ | 385/78 |

OTHER PUBLICATIONS

Siecor Installation Procedure 51P-000-001, Issue 2, Nov. 1988.
Siecor Recommended Procedure SRP-000-011, Issue 2, Sep. 1989.

*Primary Examiner*—Frank Gonzalez
*Attorney, Agent, or Firm*—J. David Abernethy

[57] ABSTRACT

Described is a furcation kit for a multiple optical fiber cable. The cable end is secured by a mechanical compression fitting and optical fibers are routed into one or more plugs each having a plurality of single optical fiber passages. A protective shell is mechanically secured around the area of furcation. The kit eliminates the need for epoxies, and capsulants, and thereby decreases the time needed for installation of the furcations.

7 Claims, 3 Drawing Sheets

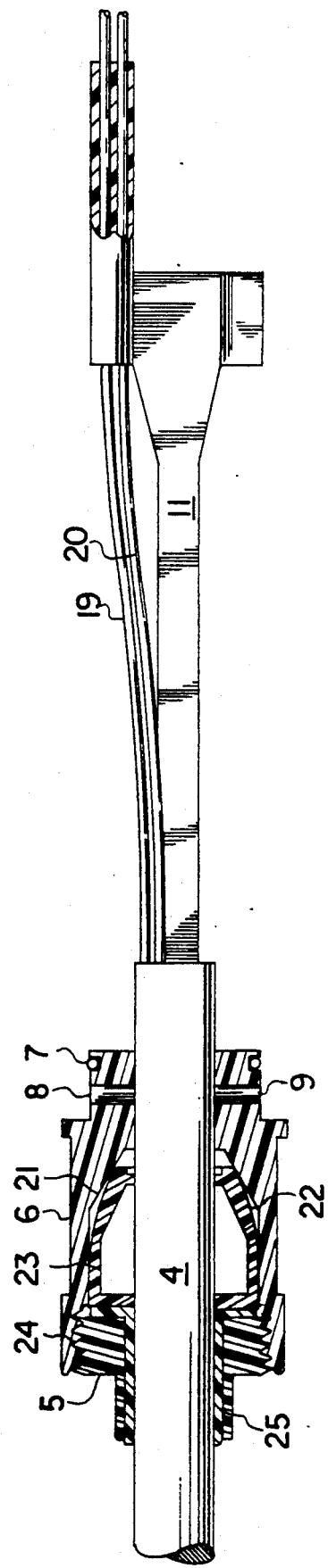

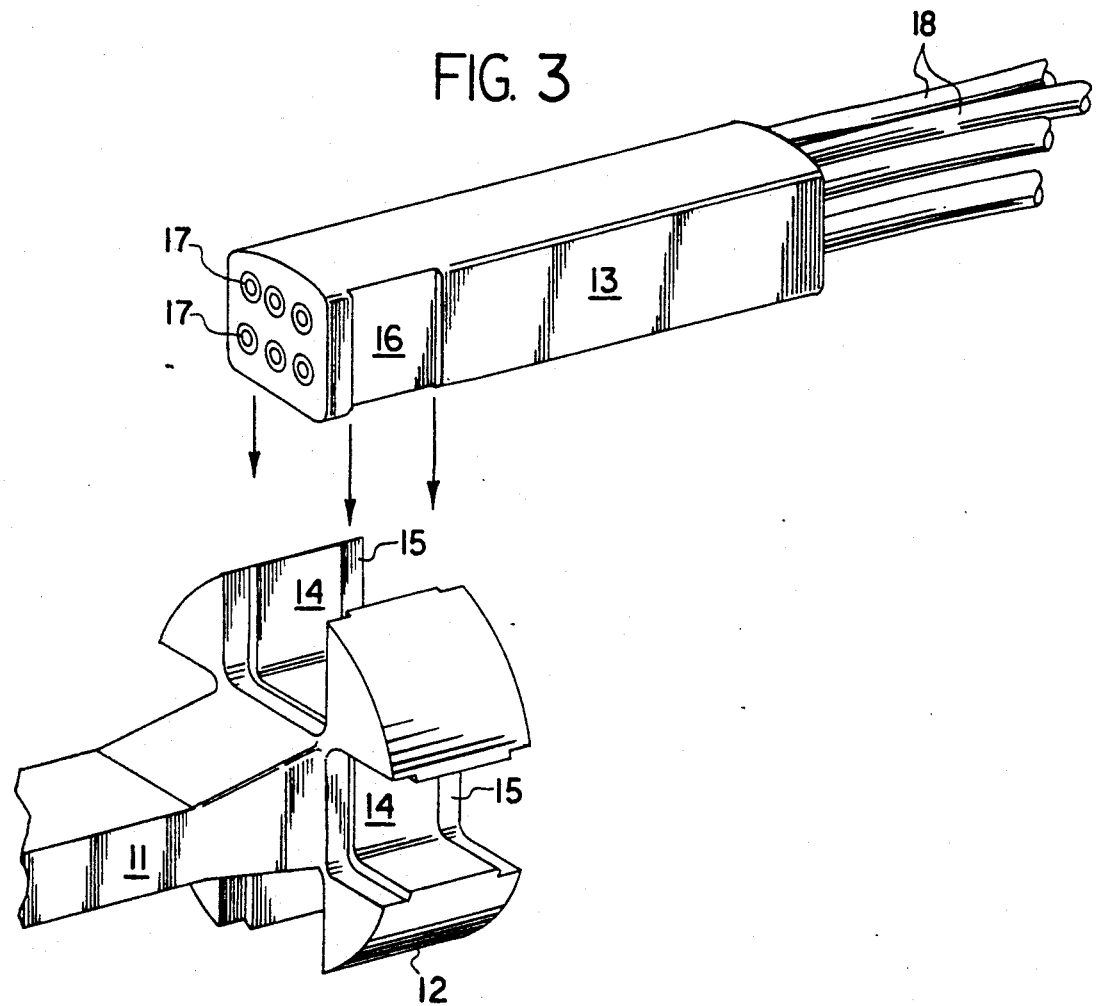

FURCATION KIT

BACKGROUND OF THE INVENTION

Access to fibers contained in fiber optic cable requires the installation of fiber optic connectors. Furcations enable a user to connectorize several optical fibers in a multiple fiber optical cable. Furcation kits sometimes do not adequately protect or secure different members of the furcation or are very difficult to assemble. Some furcation kits require use of tools or encapsulants. Alternate methods for furcation which do not require specialized tools or encapsulants would be of material advantage when extending fiber optic cables from trunk networks into local network areas.

BRIEF SUMMARY OF THE INVENTION

The furcation according to the present invention includes a securing means for securing one end of a multiple optical fiber cable, an optical plug having a plurality of single optical fiber passages, an optical jack member having a port receiving the optical plug, and a support member mounted between the securing means and the optical jack member. Multiple plugs and ports may be utilized. The securing means may comprise a rigid tubular wedging member having an inner diameter tapering from wide to narrow toward the support member, a sheath clamp within the wedging member having an outer diameter tapering from wide to narrow toward the support member, and urging means for urging the sheath clamp toward the support member to constrict the sheath clamp around a multiple optical fiber cable inserted therein. The optical jack member may be a disk having a plurality of optical plug receiving ports in the outer periphery thereof. A preferred urging means comprises a perforated block having an external screw thread engaging an internal screw thread in the tubular wedging member.

BRIEF DESCRIPTION OF THE DRAWINGS

The preferred embodiment of the invention is described with the aid of the following drawings:

FIG. 2 is a side elevation of the furcation partially sectioned along line 2—2 of FIG. 1; and, FIG. 3 is an exploded perspective view of an optical plug and a port in the optical jack member for receiving the optical plug.

DETAILED DESCRIPTION OF THE PREFERRED EMBODIMENT

Figure 1:
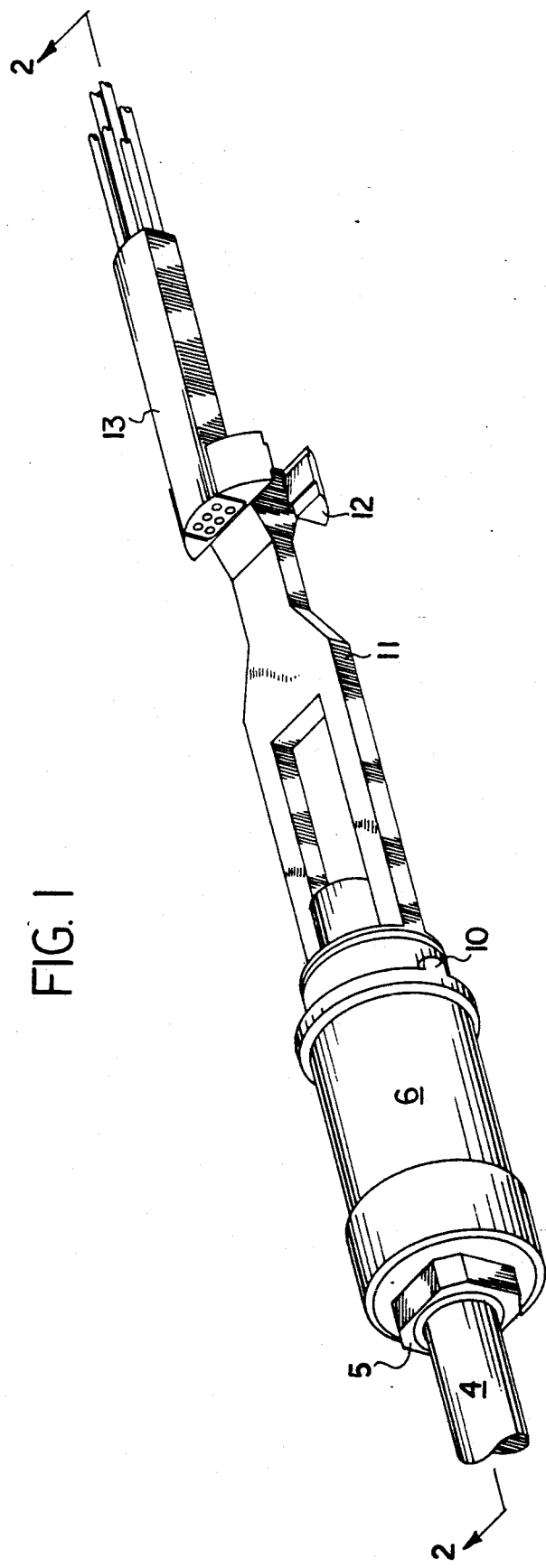
FIG. 1 is a perspective view of the furcation according to the invention.

Shown in FIGS. 1-3 is the preferred embodiment of the apparatus for furcating optical fibers contained in multiple optical fiber cable 4 to single optical fiber buffer tubes 18. Compression nut 5, bushing 25, and sheath clamp 23 are placed over the outer jacket of a free end of cable 4 and are moved back along the jacket of cable 4 a short distance. Compression nut 5, bushing 25, and sheath clamp 23 are all centrally perforated so as to fit around the outer jacket of cable 4.

An end section of the outer jacket of cable 4 is then removed, and other elements of cable 4 are removed as necessary to expose optical fibers 19, 20. Strength yarns are separated from the optical fibers and trimmed as necessary. Sheath clamp 23 is then moved to a point approximately 6 mm away from the end of the outer jacket of cable 4. The end of cable 4 is inserted through the bore of rigid tubular wedging member 6 into the rectangular interior space provided within rigid support member 11. Wedging member 6 has a recess therein for receiving O-ring 7 therein. It will be seen that sheath clamp 23 is then within the interior of wedging member 6, as best seen in FIG. 2.

Bushing 25 and compression nut 5 are then placed into the interior of wedging member 6 until the external screw thread of compression nut 5 engages the internal screw threads of wedging member 6 as shown at 24. Compression nut 5 is tightened until it is secure. As compression nut 5 is tightened, sheath clamp 23 is forced inward against the interior of wedging member 6, which has an interior diameter tapering from wide to narrow towards support member 11 at section 21. Sheath clamp 23 has an outer diameter 22 tapering from wide to narrow toward support member 11 as well, in the form of a plurality of separated protrusions. As compression nut 5 is tightened, the exterior surfaces of these protrusions 22 are forced inward by the tapering inner surfaces 21 of wedging member 6, thus securing wedging member 6 firmly to the outer jacket of cable 4. It will be seen in FIG. 2 that protrusions 22 of sheath clamp 23 have inward projections which sink into the surface of the jacket of cable 4. If it is thought desirable, a small bead of epoxy may optionally be inserted through a hole provided in the exterior surface of wedging member 6.

A plug and jack assembly is provided at the other end of rigid support member 11. Plug 13 has a plurality of passages 17 into which single optical fibers may be inserted. Secured in plug 13 are a plurality of furcation tubes 18, each tube 18 in communication with a passage 17. A plug 13 may be inserted into any of four receiving ports 15 in the outer periphery of disc 12, (optical jack member) which is integral with support member 11. Plug 13 may be inserted into and removed from a port 15 in the radial direction only as shown by FIG. 3, where shoulder 14 slides into recess 16 of plug 13. Shoulder 14 prevents separation of plug 13 in a direction parallel to passages 17 when plug 13 is received in port 15, which acts as an optical jack for plug 13.

After the appropriate number of plugs 13 are inserted into ports 15, each optical fiber 19, 20 is threaded into a separate passage 17 and a furcation tube 18, which can be connectorized as desired. A tubular shell, not shown, is then moved over tubes 18 and over central member 11, where it interlocks with tabs 10, which prevent the shell from rotating. The shell then extends from tabs 10 to cover disc 12. Screws are inserted through the shell into holes 8, 9, to complete the covering of the furcation. A separate bracket may then be used to mount the furcation to an exterior surface.

The various parts of the furcation are molded from a hard plastic to provide for a stable, rigid covering to protect the optical fibers from exterior stress.

What is claimed is:

1. Apparatus for furcating a multiple optical fiber cable comprising:
   a. securing means for securing one end of a multiple optical fiber cable;
   b. an optical plug having a plurality of single optical fiber passages;
   c. an optical jack member having a port receiving the optical plug; and,
   d. a support member mounted between the securing means and the optical jack member.

2. Apparatus as recited in claim 1, wherein the securing means comprises a rigid tubular wedging member having an inner diameter tapering from wide to narrow toward the support member, a sheath clamp within the wedging member having an outer diameter tapering from wide to narrow toward the support member, and urging means for urging the sheath clamp toward the support member to constrict the sheath clamp around a multiple optical fiber cable inserted therein.

3. Apparatus as recited in claim 1, wherein the optical jack member is a disc having a plurality of optical plug receiving ports in the outer periphery thereof.

4. Apparatus as recited in claim 2, wherein the optical jack member is a disc having a plurality of optical plug receiving ports in the outer periphery thereof.

5. Apparatus as recited in claim 2, wherein the urging means comprises a perforated block having an external screw thread engaging an internal screw thread in the tubular wedging member.

6. Apparatus as recited in claim 4, wherein the urging means comprises a perforated block having an external screw thread engaging an internal screw thread in the tubular wedging member.

7. Apparatus as recited in claim 1, further comprising plug securing means for preventing separation of the optical plug in a direction parallel to the single optical fiber passages when such optical plug is received in the optical jack.

* * * * *